United States Patent
Park et al.

(10) Patent No.: US 8,861,634 B2
(45) Date of Patent: Oct. 14, 2014

(54) TRANSMISSION DEVICE, RECEIVING DEVICE, INFORMATION TRANSMISSION METHOD, INFORMATION RECEIVING METHOD IN WIRELESS COMMUNICATION SYSTEM, AND RECORDING MEDIUM

(75) Inventors: Kyoungmin Park, Seoul (KR); Jianjun Li, Seoul (KR); Sungjin Suh, Seoul (KR); Sungkwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 69 days.

(21) Appl. No.: 13/639,473

(22) PCT Filed: Mar. 31, 2011

(86) PCT No.: PCT/KR2011/002257
§ 371 (c)(1),
(2), (4) Date: Oct. 4, 2012

(87) PCT Pub. No.: WO2011/126236
PCT Pub. Date: Oct. 13, 2011

(65) Prior Publication Data
US 2013/0022140 A1    Jan. 24, 2013

(30) Foreign Application Priority Data

Apr. 6, 2010    (KR) .................. 10-2010-0031304

(51) Int. Cl.
*H04L 1/02*    (2006.01)
*H04B 7/06*    (2006.01)
*H04B 7/04*    (2006.01)

(52) U.S. Cl.
CPC .......... *H04B 7/0617* (2013.01); *H04B 7/0473* (2013.01); *H04B 7/0639* (2013.01)
USPC ......................................... 375/267

(58) Field of Classification Search
CPC ...... H04L 1/0618; H04L 1/06; H04B 7/0456; H04B 7/0639
USPC ......... 375/267, 239, 296, 340, 347, 348, 349; 455/214, 337
See application file for complete search history.

(56) References Cited

U.S. PATENT DOCUMENTS

| | | |
|---|---|---|
| 2009/0080560 A1 | 3/2009 | Na et al. |
| 2009/0110114 A1 | 4/2009 | Onggosanusi et al. |
| 2009/0322613 A1 | 12/2009 | Bala et al. |
| 2010/0039928 A1* | 2/2010 | Noh et al. ............ 370/210 |
| 2010/0220801 A1* | 9/2010 | Lee et al. ............ 375/267 |
| 2010/0226455 A1* | 9/2010 | Porat et al. .......... 375/267 |
| 2010/0272014 A1 | 10/2010 | Orlik et al. |
| 2012/0033630 A1* | 2/2012 | Chung et al. ......... 370/329 |

OTHER PUBLICATIONS

International Search Report for related International Application No. PCT/KR2011/002257 dated Dec. 26, 2011.

* cited by examiner

*Primary Examiner* — Khai Tran
(74) *Attorney, Agent, or Firm* — H.C. Park & Associates, PLC

(57) ABSTRACT

The present invention relates to a transmission device, a receiving device, an information transmission method, and an information receiving method in a wireless communication system, and a recording medium in which data of a codebook used for transmitting and receiving information is recorded.

16 Claims, 10 Drawing Sheets

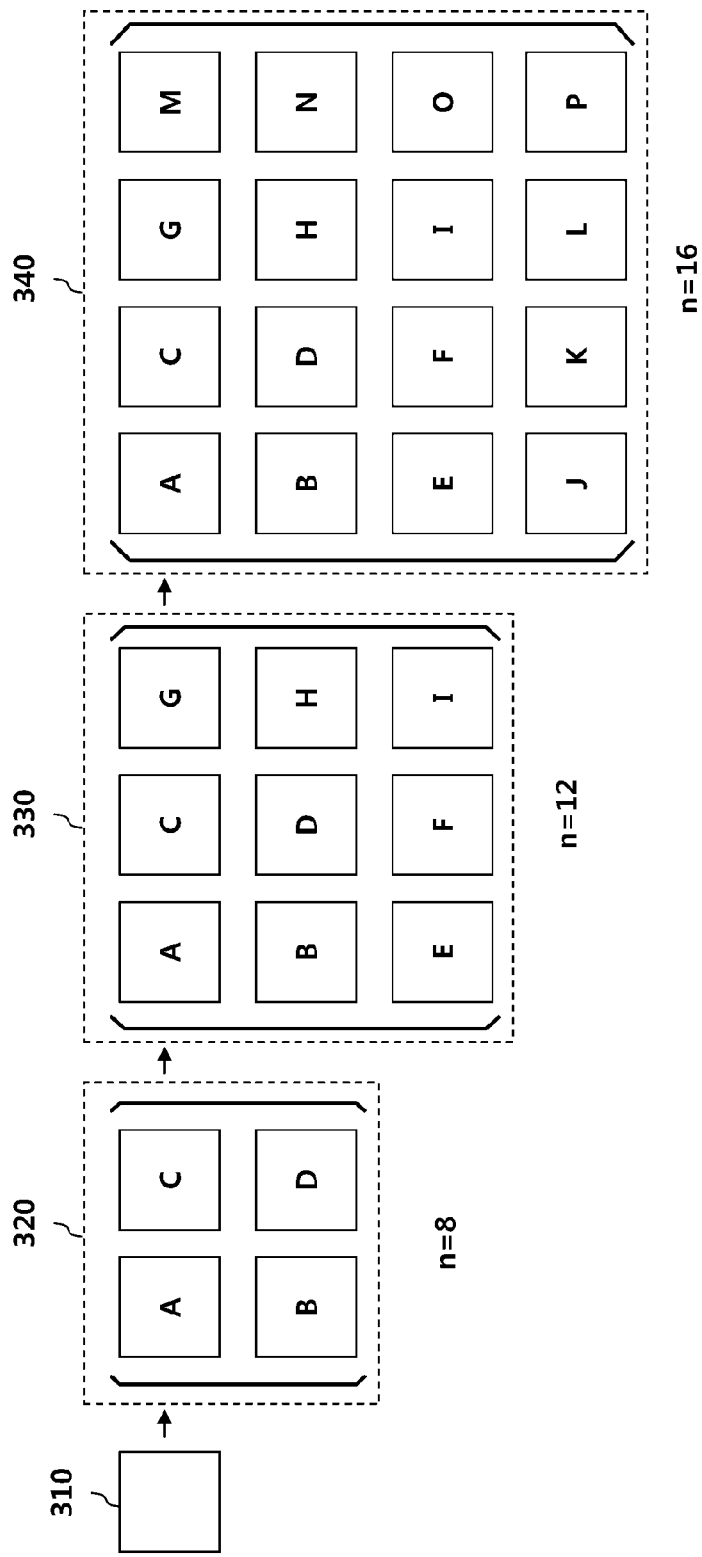

FIG.4

| | Possible set of $R_n$ |
|---|---|
| $C = 1$ | $\begin{bmatrix} R_1 & R_3 \\ R_2 & R_4 \end{bmatrix}$ $\begin{bmatrix} R_1 & R_4 \\ R_2 & R_3 \end{bmatrix}$ $\begin{bmatrix} R_1 & R_3 \\ R_4 & R_2 \end{bmatrix}$ $\begin{bmatrix} R_2 & R_3 \\ R_1 & R_4 \end{bmatrix}$ $\begin{bmatrix} R_2 & R_4 \\ R_1 & R_3 \end{bmatrix}$ $\begin{bmatrix} R_2 & R_4 \\ R_3 & R_1 \end{bmatrix}$ <br> $\begin{bmatrix} R_3 & R_1 \\ R_2 & R_4 \end{bmatrix}$ $\begin{bmatrix} R_3 & R_1 \\ R_4 & R_2 \end{bmatrix}$ $\begin{bmatrix} R_3 & R_2 \\ R_4 & R_1 \end{bmatrix}$ $\begin{bmatrix} R_4 & R_2 \\ R_1 & R_3 \end{bmatrix}$ $\begin{bmatrix} R_4 & R_1 \\ R_3 & R_2 \end{bmatrix}$ $\begin{bmatrix} R_4 & R_2 \\ R_3 & R_1 \end{bmatrix}$ <br> $\begin{bmatrix} R_5 & R_7 \\ R_6 & R_8 \end{bmatrix}$ $\begin{bmatrix} R_5 & R_8 \\ R_6 & R_7 \end{bmatrix}$ $\begin{bmatrix} R_6 & R_7 \\ R_5 & R_8 \end{bmatrix}$ $\begin{bmatrix} R_6 & R_8 \\ R_5 & R_7 \end{bmatrix}$ $\begin{bmatrix} R_7 & R_5 \\ R_8 & R_6 \end{bmatrix}$ $\begin{bmatrix} R_7 & R_6 \\ R_8 & R_5 \end{bmatrix}$ <br> $\begin{bmatrix} R_8 & R_5 \\ R_7 & R_6 \end{bmatrix}$ $\begin{bmatrix} R_8 & R_6 \\ R_7 & R_5 \end{bmatrix}$ <br> $\begin{bmatrix} R_9 & R_{11} \\ R_{10} & R_{12} \end{bmatrix}$ $\begin{bmatrix} R_9 & R_{12} \\ R_{10} & R_{11} \end{bmatrix}$ $\begin{bmatrix} R_{10} & R_{11} \\ R_9 & R_{12} \end{bmatrix}$ $\begin{bmatrix} R_{10} & R_{12} \\ R_9 & R_{11} \end{bmatrix}$ <br> $\begin{bmatrix} R_{11} & R_9 \\ R_{12} & R_{10} \end{bmatrix}$ $\begin{bmatrix} R_{11} & R_{10} \\ R_{12} & R_9 \end{bmatrix}$ $\begin{bmatrix} R_{12} & R_9 \\ R_{11} & R_{10} \end{bmatrix}$ $\begin{bmatrix} R_{12} & R_{10} \\ R_{11} & R_9 \end{bmatrix}$ <br> $\begin{bmatrix} R_{14} & R_{13} \\ R_{16} & R_{14} \end{bmatrix}$ $\begin{bmatrix} R_{16} & R_{14} \\ R_{14} & R_{13} \end{bmatrix}$ $\begin{bmatrix} R_{13} & R_{14} \\ R_{14} & R_{16} \end{bmatrix}$ $\begin{bmatrix} R_{14} & R_{16} \\ R_{13} & R_{14} \end{bmatrix}$ |

| | Possible set of $R_n$ |
|---|---|
| $C = -1$ | $\begin{bmatrix} R_1 & R_2 \\ R_2 & R_1 \end{bmatrix}$ $\begin{bmatrix} R_2 & R_1 \\ R_1 & R_2 \end{bmatrix}$ $\begin{bmatrix} R_1 & R_3 \\ R_3 & R_1 \end{bmatrix}$ $\begin{bmatrix} R_3 & R_1 \\ R_1 & R_3 \end{bmatrix}$ $\begin{bmatrix} R_1 & R_9 \\ R_9 & R_1 \end{bmatrix}$ $\begin{bmatrix} R_9 & R_1 \\ R_1 & R_9 \end{bmatrix}$ <br> $\begin{bmatrix} R_1 & R_{11} \\ R_{11} & R_1 \end{bmatrix}$ $\begin{bmatrix} R_{11} & R_1 \\ R_1 & R_{11} \end{bmatrix}$ $\begin{bmatrix} R_2 & R_4 \\ R_4 & R_2 \end{bmatrix}$ $\begin{bmatrix} R_4 & R_2 \\ R_2 & R_4 \end{bmatrix}$ $\begin{bmatrix} R_2 & R_{10} \\ R_{10} & R_2 \end{bmatrix}$ $\begin{bmatrix} R_{10} & R_2 \\ R_2 & R_{10} \end{bmatrix}$ <br> $\begin{bmatrix} R_3 & R_4 \\ R_4 & R_3 \end{bmatrix}$ $\begin{bmatrix} R_4 & R_3 \\ R_3 & R_4 \end{bmatrix}$ $\begin{bmatrix} R_5 & R_6 \\ R_6 & R_5 \end{bmatrix}$ $\begin{bmatrix} R_6 & R_5 \\ R_5 & R_6 \end{bmatrix}$ $\begin{bmatrix} R_7 & R_8 \\ R_8 & R_7 \end{bmatrix}$ $\begin{bmatrix} R_8 & R_7 \\ R_7 & R_8 \end{bmatrix}$ <br> $\begin{bmatrix} R_9 & R_{10} \\ R_{10} & R_9 \end{bmatrix}$ $\begin{bmatrix} R_{10} & R_9 \\ R_9 & R_{10} \end{bmatrix}$ $\begin{bmatrix} R_{11} & R_{12} \\ R_{12} & R_{11} \end{bmatrix}$ $\begin{bmatrix} R_{12} & R_{11} \\ R_{11} & R_{12} \end{bmatrix}$ $\begin{bmatrix} R_{13} & R_{15} \\ R_{15} & R_{13} \end{bmatrix}$ $\begin{bmatrix} R_{15} & R_{13} \\ R_{13} & R_{15} \end{bmatrix}$ <br> $\begin{bmatrix} R_{16} & R_{13} \\ R_{13} & R_{16} \end{bmatrix}$ $\begin{bmatrix} R_{13} & R_{16} \\ R_{16} & R_{13} \end{bmatrix}$ <br> $\begin{bmatrix} R_1 & R_{13} \\ R_3 & R_{15} \end{bmatrix}$ $\begin{bmatrix} R_1 & R_{15} \\ R_3 & R_{13} \end{bmatrix}$ $\begin{bmatrix} R_3 & R_{13} \\ R_1 & R_{15} \end{bmatrix}$ $\begin{bmatrix} R_3 & R_{15} \\ R_1 & R_{13} \end{bmatrix}$ $\begin{bmatrix} R_{13} & R_1 \\ R_{15} & R_3 \end{bmatrix}$ $\begin{bmatrix} R_{13} & R_3 \\ R_{15} & R_1 \end{bmatrix}$ <br> $\begin{bmatrix} R_{15} & R_1 \\ R_{13} & R_3 \end{bmatrix}$ $\begin{bmatrix} R_{15} & R_3 \\ R_{13} & R_1 \end{bmatrix}$ $\begin{bmatrix} R_n & R_n \\ R_n & R_n \end{bmatrix}$ for $n = 1 \sim 16$ |

FIG.5

| | Possible set of $R_n$ |
|---|---|
| $C = 1$ | $\begin{bmatrix} R_1 & R_3 \\ R_2 & R_4 \end{bmatrix} \begin{bmatrix} R_1 & R_4 \\ R_2 & R_3 \end{bmatrix} \begin{bmatrix} R_1 & R_3 \\ R_4 & R_2 \end{bmatrix} \begin{bmatrix} R_2 & R_3 \\ R_1 & R_4 \end{bmatrix} \begin{bmatrix} R_2 & R_4 \\ R_1 & R_3 \end{bmatrix} \begin{bmatrix} R_2 & R_4 \\ R_3 & R_1 \end{bmatrix}$ <br> $\begin{bmatrix} R_5 & R_7 \\ R_6 & R_8 \end{bmatrix} \begin{bmatrix} R_5 & R_8 \\ R_6 & R_7 \end{bmatrix} \begin{bmatrix} R_6 & R_7 \\ R_5 & R_8 \end{bmatrix} \begin{bmatrix} R_6 & R_8 \\ R_5 & R_7 \end{bmatrix}$ <br> $\begin{bmatrix} R_9 & R_{11} \\ R_{10} & R_{12} \end{bmatrix} \begin{bmatrix} R_9 & R_{12} \\ R_{10} & R_{11} \end{bmatrix} \begin{bmatrix} R_{10} & R_{11} \\ R_9 & R_{12} \end{bmatrix} \begin{bmatrix} R_{10} & R_{12} \\ R_9 & R_{11} \end{bmatrix}$ <br> $\begin{bmatrix} R_{14} & R_{13} \\ R_{16} & R_{14} \end{bmatrix} \begin{bmatrix} R_{16} & R_{14} \\ R_{14} & R_{13} \end{bmatrix}$ |

| | Possible set of $R_n$ |
|---|---|
| $C = -1$ | $\begin{bmatrix} R_1 & R_2 \\ R_2 & R_1 \end{bmatrix} \begin{bmatrix} R_1 & R_3 \\ R_3 & R_1 \end{bmatrix} \begin{bmatrix} R_1 & R_9 \\ R_9 & R_1 \end{bmatrix} \begin{bmatrix} R_1 & R_{11} \\ R_{11} & R_1 \end{bmatrix} \begin{bmatrix} R_2 & R_4 \\ R_4 & R_2 \end{bmatrix} \begin{bmatrix} R_2 & R_{10} \\ R_{10} & R_2 \end{bmatrix}$ <br> $\begin{bmatrix} R_3 & R_4 \\ R_4 & R_3 \end{bmatrix} \begin{bmatrix} R_5 & R_6 \\ R_6 & R_5 \end{bmatrix} \begin{bmatrix} R_7 & R_8 \\ R_8 & R_7 \end{bmatrix} \begin{bmatrix} R_9 & R_{10} \\ R_{10} & R_9 \end{bmatrix} \begin{bmatrix} R_{11} & R_{12} \\ R_{12} & R_{11} \end{bmatrix} \begin{bmatrix} R_{13} & R_{15} \\ R_{15} & R_{13} \end{bmatrix}$ <br> $\begin{bmatrix} R_{16} & R_{13} \\ R_{13} & R_{16} \end{bmatrix}$ <br> $\begin{bmatrix} R_1 & R_{13} \\ R_3 & R_{15} \end{bmatrix} \begin{bmatrix} R_1 & R_{15} \\ R_3 & R_{13} \end{bmatrix} \begin{bmatrix} R_3 & R_{13} \\ R_1 & R_{15} \end{bmatrix} \begin{bmatrix} R_3 & R_{15} \\ R_1 & R_{13} \end{bmatrix}$ <br> $\begin{bmatrix} R_n & R_n \\ R_n & R_n \end{bmatrix}$ for $n = 1 \sim 16$ |

FIG. 6

| | Possible set of $R_n$ |
|---|---|
| $C = 1$ | $\begin{bmatrix} R_1 & R_3 \\ R_2 & R_4 \end{bmatrix}$ $\begin{bmatrix} R_1 & R_4 \\ R_2 & R_3 \end{bmatrix}$ $\begin{bmatrix} R_1 & R_3 \\ R_4 & R_2 \end{bmatrix}$ $\begin{bmatrix} R_2 & R_4 \\ R_3 & R_1 \end{bmatrix}$ $\begin{bmatrix} R_5 & R_7 \\ R_6 & R_8 \end{bmatrix}$ $\begin{bmatrix} R_5 & R_8 \\ R_6 & R_7 \end{bmatrix}$ $\begin{bmatrix} R_9 & R_{11} \\ R_{10} & R_{12} \end{bmatrix}$ $\begin{bmatrix} R_9 & R_{12} \\ R_{10} & R_{11} \end{bmatrix}$ $\begin{bmatrix} R_{14} & R_{13} \\ R_{16} & R_{14} \end{bmatrix}$ |

| | Possible set of $R_n$ |
|---|---|
| $C = -1$ | $\begin{bmatrix} R_1 & R_2 \\ R_2 & R_1 \end{bmatrix}$ $\begin{bmatrix} R_1 & R_3 \\ R_3 & R_1 \end{bmatrix}$ $\begin{bmatrix} R_1 & R_9 \\ R_9 & R_1 \end{bmatrix}$ $\begin{bmatrix} R_1 & R_{11} \\ R_{11} & R_1 \end{bmatrix}$ $\begin{bmatrix} R_2 & R_4 \\ R_4 & R_2 \end{bmatrix}$ $\begin{bmatrix} R_2 & R_{10} \\ R_{10} & R_2 \end{bmatrix}$ $\begin{bmatrix} R_3 & R_4 \\ R_4 & R_3 \end{bmatrix}$ $\begin{bmatrix} R_5 & R_6 \\ R_6 & R_5 \end{bmatrix}$ $\begin{bmatrix} R_7 & R_8 \\ R_8 & R_7 \end{bmatrix}$ $\begin{bmatrix} R_9 & R_{10} \\ R_{10} & R_9 \end{bmatrix}$ $\begin{bmatrix} R_{11} & R_{12} \\ R_{12} & R_{11} \end{bmatrix}$ $\begin{bmatrix} R_{13} & R_{15} \\ R_{15} & R_{13} \end{bmatrix}$ $\begin{bmatrix} R_{16} & R_{13} \\ R_{13} & R_{16} \end{bmatrix}$ $\begin{bmatrix} R_1 & R_{13} \\ R_3 & R_{15} \end{bmatrix}$ $\begin{bmatrix} R_1 & R_{15} \\ R_3 & R_{13} \end{bmatrix}$ $\begin{bmatrix} R_n & R_n \\ R_n & R_n \end{bmatrix}$ for $n = 1 \sim 16$ |

FIG. 7

| PMI1 | matrix |
|---|---|
| 0 | $\begin{bmatrix} \alpha_0 W_0^{(4)} & \alpha_2 W_2^{(4)} \\ \alpha_1 W_1^{(4)} & \alpha_3 W_3^{(4)} \end{bmatrix}$ |
| 1 | $\begin{bmatrix} \alpha_0 W_4^{(4)} & \alpha_2 W_6^{(4)} \\ \alpha_1 W_5^{(4)} & \alpha_3 W_7^{(4)} \end{bmatrix}$ |
| 2 | $\begin{bmatrix} \alpha_0 W_0^{(4)} & \alpha_2 W_3^{(4)} \\ \alpha_1 W_1^{(4)} & \alpha_3 W_2^{(4)} \end{bmatrix}$ |
| 3 | $\begin{bmatrix} \alpha_0 W_4^{(4)} & \alpha_2 W_7^{(4)} \\ \alpha_1 W_5^{(4)} & \alpha_3 W_6^{(4)} \end{bmatrix}$ |
| 4 | $\begin{bmatrix} \alpha_0 W_0^{(4)} & \alpha_2 W_2^{(4)} \\ \alpha_1 W_3^{(4)} & \alpha_3 W_1^{(4)} \end{bmatrix}$ |
| 5 | $\begin{bmatrix} \alpha_0 W_8^{(4)} & \alpha_2 W_{10}^{(4)} \\ \alpha_1 W_9^{(4)} & \alpha_3 W_{11}^{(4)} \end{bmatrix}$ |
| 6 | $\begin{bmatrix} \alpha_0 W_1^{(4)} & \alpha_2 W_3^{(4)} \\ \alpha_1 W_2^{(4)} & \alpha_3 W_0^{(4)} \end{bmatrix}$ |
| 7 | $\begin{bmatrix} \alpha_0 W_8^{(4)} & \alpha_2 W_{11}^{(4)} \\ \alpha_1 W_9^{(4)} & \alpha_3 W_{10}^{(4)} \end{bmatrix}$ |

$$\begin{bmatrix} \alpha_0 & \alpha_2 \\ \alpha_1 & \alpha_3 \end{bmatrix} = \begin{bmatrix} 1 & 1 \\ 1 & 1 \end{bmatrix}$$

FIG.8

| PMI1 | matrix |
|---|---|
| 0 | $\begin{bmatrix} \alpha_0 W_0^{(4)} & \alpha_2 W_2^{(4)} \\ \alpha_1 W_1^{(4)} & \alpha_3 W_3^{(4)} \end{bmatrix}$ |
| 1 | $\begin{bmatrix} \alpha_0 W_4^{(4)} & \alpha_2 W_6^{(4)} \\ \alpha_1 W_5^{(4)} & \alpha_3 W_7^{(4)} \end{bmatrix}$ |
| 2 | $\begin{bmatrix} \alpha_0 W_0^{(4)} & \alpha_2 W_3^{(4)} \\ \alpha_1 W_1^{(4)} & \alpha_3 W_2^{(4)} \end{bmatrix}$ |
| 3 | $\begin{bmatrix} \alpha_0 W_4^{(4)} & \alpha_2 W_7^{(4)} \\ \alpha_1 W_5^{(4)} & \alpha_3 W_6^{(4)} \end{bmatrix}$ |
| 4 | $\begin{bmatrix} \alpha_0 W_0^{(4)} & \alpha_2 W_2^{(4)} \\ \alpha_1 W_3^{(4)} & \alpha_3 W_1^{(4)} \end{bmatrix}$ |
| 5 | $\begin{bmatrix} \alpha_0 W_8^{(4)} & \alpha_2 W_{10}^{(4)} \\ \alpha_1 W_9^{(4)} & \alpha_3 W_{11}^{(4)} \end{bmatrix}$ |
| 6 | $\begin{bmatrix} \alpha_0 W_1^{(4)} & \alpha_2 W_3^{(4)} \\ \alpha_1 W_2^{(4)} & \alpha_3 W_0^{(4)} \end{bmatrix}$ |
| 7 | $\begin{bmatrix} \alpha_0 W_8^{(4)} & \alpha_2 W_{11}^{(4)} \\ \alpha_1 W_9^{(4)} & \alpha_3 W_{10}^{(4)} \end{bmatrix}$ |

| PMI2 | matrix |
|---|---|
| 0 | $\begin{bmatrix} \alpha_0 & \alpha_2 \\ \alpha_1 & \alpha_3 \end{bmatrix} = \begin{bmatrix} 1 & 1 \\ 1 & 1 \end{bmatrix}$ |
| 1 | $\begin{bmatrix} \alpha_0 & \alpha_2 \\ \alpha_1 & \alpha_3 \end{bmatrix} = \begin{bmatrix} 1 & -1 \\ -1 & 1 \end{bmatrix}$ |

FIG. 10

| CODEBOOK INDEX | $u_n$ | NUMBER OF LAYERS $v$ | | | |
|---|---|---|---|---|---|
| | | 1 | 2 | 3 | 4 |
| 0 | $u_0 = [1 \ -1 \ -1 \ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1 \ -j \ 1 \ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1 \ 1 \ -1 \ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1 \ j \ 1 \ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1 \ (-1-j)/\sqrt{2} \ -j \ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1 \ (1-j)/\sqrt{2} \ j \ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1 \ (1+j)/\sqrt{2} \ -j \ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1 \ (-1+j)/\sqrt{2} \ j \ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1 \ -1 \ 1 \ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1 \ -j \ -1 \ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1 \ 1 \ 1 \ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1 \ j \ -1 \ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1 \ -1 \ -1 \ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1 \ -1 \ 1 \ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1 \ 1 \ -1 \ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1 \ 1 \ 1 \ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

TRANSMISSION DEVICE, RECEIVING DEVICE, INFORMATION TRANSMISSION METHOD, INFORMATION RECEIVING METHOD IN WIRELESS COMMUNICATION SYSTEM, AND RECORDING MEDIUM

CROSS-REFERENCE TO RELATED APPLICATION

This application is the National Stage Entry of International Application PCT/KR2011/002257, filed on Mar. 31, 2011, and claims priority from and the benefit of Korean Patent Application No. 10-2010-0031304, filed on Apr. 6, 2010, all of which are incorporated herein by reference as if fully set forth herein.

BACKGROUND

1. Field

The present invention relates to a transmission device, a receiving device, a method for transmitting information and a method for receiving information in a wireless communication system, and a recording medium, in which data of a codebook used during transmission and reception of information is recorded.

2. Discussion of the Background

With the progress of communication systems, consumers such as companies and individuals have used a wide variety of wireless terminals.

Accordingly, communication service providers have continued to attempt to create a new communication service market for wireless terminals, and expand the existing communication service market by providing reliable and low-cost services.

SUMMARY

Therefore, an aspect of the present invention is to provide a method for designing a codebook for an array of a larger size by using a codebook for an array of a small size in order to extend the size of a codebook, and to provide a wireless communication system capable of increasing communication capacity through the method.

In order to achieve the above objects, in accordance with an aspect of the present invention, there is provided a transmission device in a wireless communication system, which includes: a layer mapper for mapping a codeword to one or more layers; and a precoder for precoding symbols mapped by the layer mapper, by using an n*n precoding matrix matched with an input precoding matrix indicator among n*n precoding matrixes included in a codebook for an n*n MIMO (Multiple Input Multiple Output, hereinafter referred to as "MIMO"), which includes the n*n precoding matrixes obtained by combining 4*4 precoding matrixes included in a codebook for a 4*4 MIMO.

In accordance with another aspect of the present invention, there is provided a method for transmitting information in a wireless communication system, which includes: mapping a codeword to be transmitted to one or more layers; and precoding symbols mapped by a layer mapper, by using an n*n precoding matrix matched with an input precoding matrix indicator among n*n precoding matrixes included in a codebook for an n*n MIMO, which includes the n*n precoding matrixes obtained by combining 4*4 precoding matrixes included in a codebook for a 4*4 MIMO.

In accordance with still another aspect of the present invention, there is provided a receiving device in a wireless communication system, which includes: a channel estimator for transmitting a precoding matrix indicator selected according to a channel state by using a codebook for an n*n MIMO which includes n*n precoding matrixes obtained by combining 4*4 precoding matrixes included in a codebook for a 4*4 MIMO; and a signal receiver for receiving a precoded signal based on the transmitted precoding matrix indicator.

In accordance with yet another aspect of the present invention, there is provided a method for receiving information in a wireless communication system, which includes: transmitting a precoding matrix indicator selected based on channel state information by using a codebook for an n*n MIMO which includes n*n precoding matrixes obtained by combining 4*4 precoding matrixes included in a codebook for a 4*4 MIMO; and receiving a precoded signal based on the transmitted precoding matrix indicator.

In accordance with still yet another aspect of the present invention, there is provided a computer-readable recording medium for recording data of a codebook for an n*n MIMO, which includes n*n precoding matrixes, which are obtained by combining 4*4 precoding matrixes included in a codebook for a 4*4 MIMO, and for which a search is made in response to a precoding matrix indicator In accordance with further another aspect of the present invention, there is provided a computer-readable recording medium for recording data of a codebook for an n*n MIMO, which includes n*n precoding matrixes, which are obtained by combining 4*4 precoding matrixes included in a codebook for a 4*4 MIMO, and for which a search is made based on channel state information.

BRIEF DESCRIPTION OF THE DRAWINGS

FIG. 3 is a view showing an example of a codebook for an n*n MIMO.

FIG. 4 is a view showing an example of a codebook for an n*n MIMO when n=8.

FIG. 5 is a view showing another example of a codebook for an n*n MIMO when n=8.

FIG. 6 is a view showing still another example of a codebook for an n*n MIMO when n=8.

FIG. 7 is a view showing an example of generating a codebook for an 8*8 MIMO as a single codebook having a size of 8 by using combinations as shown in FIG. 6.

FIG. 8 is a view showing an example of generating a codebook for an 8*8 MIMO as two codebooks by using combinations as shown in FIG. 6.

FIG. 10 is a view showing an example of a codebook for a 4*4 MIMO.

DETAILED DESCRIPTION OF THE ILLUSTRATED EMBODIMENTS

Figure 1:
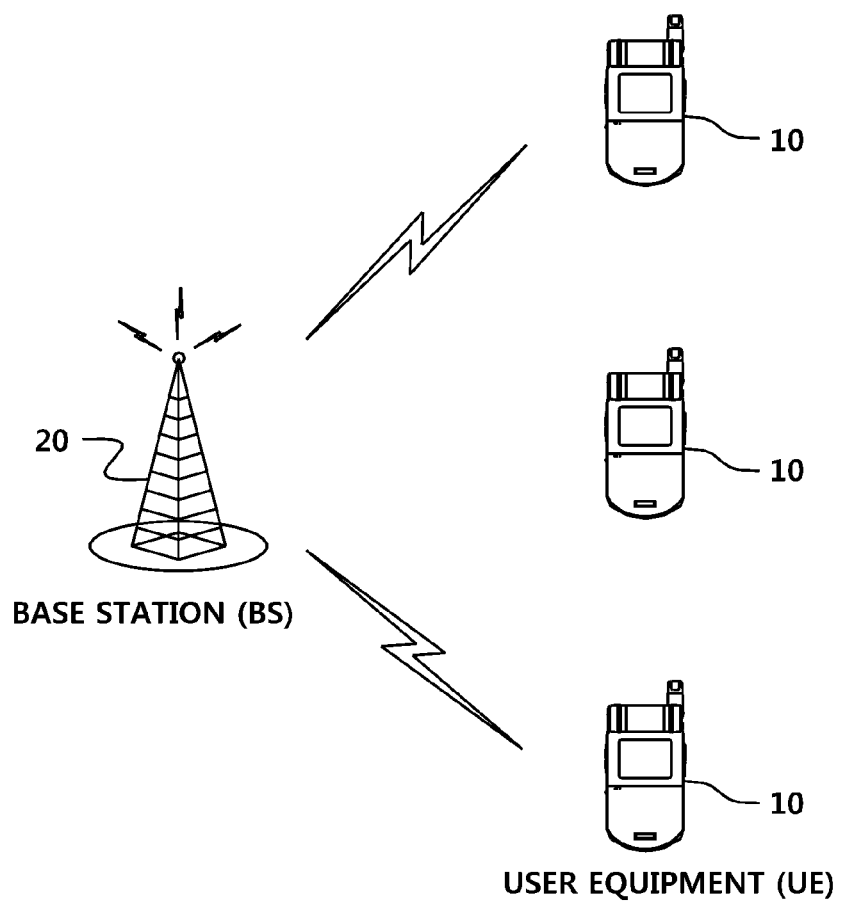
FIG. 1 is a view schematically showing a wireless communication system, to which exemplary embodiments of the present invention are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Also, in describing the present invention, a detailed description of publicly-known functions or configurations related to the present invention will be omitted when it is determined that the detailed description thereof may unnecessarily obscure the subject matter of the present invention.

FIG. 1 is a view schematically showing a wireless communication system, to which exemplary embodiments of the present invention are applied.

The wireless communication system is widely arranged in order to provide various communication services, such as voice and packet data.

Referring to FIG. 1, the wireless communication system includes a User Equipment (UE) 10 and a Base Station (BS) 20. The UE 10 and the BS 20 use various power allocation methods which will be described below.

In this specification, the UE 10 has a comprehensive concept implying a user terminal in wireless communication. Accordingly, the UEs should be interpreted as having the concept of including a MS (Mobile Station), a UT (User Terminal), an SS (Subscriber Station), a wireless device, and the like in GSM (Global System for Mobile Communications) as well as UEs (User Equipments) in WCDMA (Wideband Code Division Multiple Access), LTE (Long Term Evolution), HSPA (High Speed Packet Access), etc.

The BS 20 or a cell usually refers to a fixed station communicating with the UE 10, and may be called different terms, such as a Node-B, an eNB (evolved Node-B), a BTS (Base Transceiver System) and an AP (Access Point).

In this specification, the UE 10 and the BS 20, which are two transmission and reception subjects used to implement the art or the technical idea described in this specification, are used as a comprehensive meaning, and are not limited by a particularly designated term or word.

A power allocation technology according to an embodiment of the present invention may be applied to the allocation of resources in the field of asynchronous wireless communications which have gone through GSM, WCDMA and HSPA, and evolve into LTE (Long Term Evolution) and LTE-advanced, and in the field of synchronous wireless communications which evolve into CDMA, CDMA-2000 and UMB. The present invention should not be interpreted as being limited to or restricted by a particular wireless communication field, and should be interpreted as including all technical fields to which the spirit of the present invention can be applied.

Figure 2:
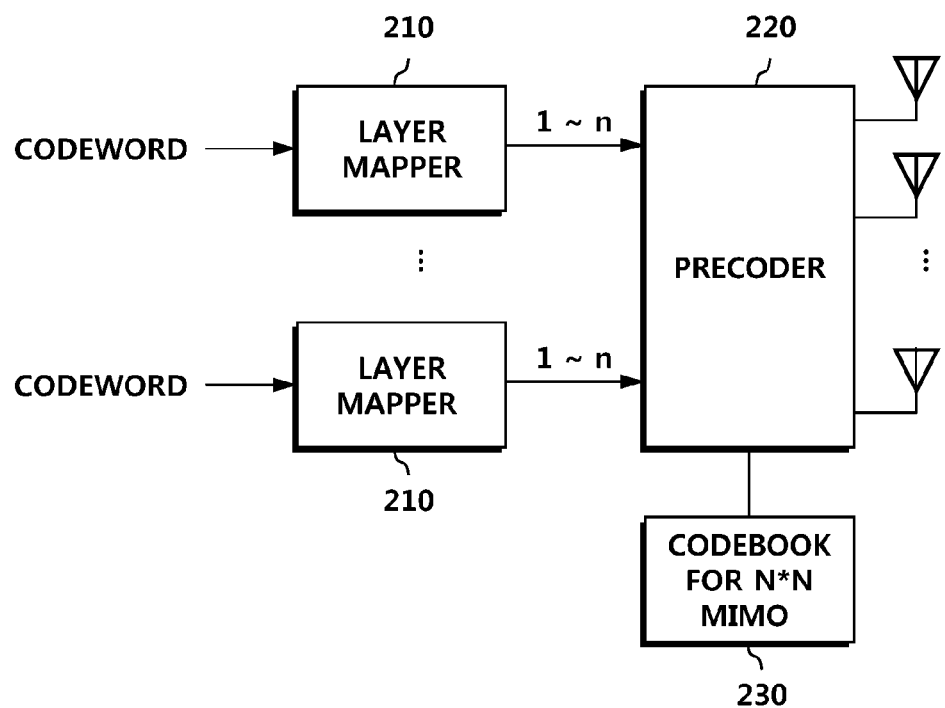
FIG. 2 is a block diagram showing the configuration of a transmission device according to an exemplary embodiment of the present invention.

FIG. 2 is a block diagram showing the configuration of a transmission device 200 according to an exemplary embodiment of the present invention.

Referring to FIG. 2, the transmission device 200 may include a layer mapper 210, a precoder 220 and the like, and may include a recording medium, in which data of a codebook 230 for an n*n MIMO is recorded. The transmission device 200 may be a communication system or a transmission device of the BS 20 as shown in FIG. 1.

The layer mapper 210 included in the transmission device 200 maps a codeword to one or more layers. The precoder 220 searches for an n*n precoding matrix matched with an input precoding matrix indicator among n*n precoding matrixes included in a codebook 230 for an n*n MIMO including n*n precoding matrixes obtained by combining 4*4 precoding matrixes included in a codebook for a 4*4 MIMO. Then, the precoder 220 precodes symbols, which have been mapped by the layer mapper 210, by using the found n*n precoding matrix.

The precoding matrix indicator that the precoder 220 receives as input for precoding, is also called a "codebook index." According to a relevant channel state, the precoder 220 may receive, as input, the precoding matrix indicator from a receiving device 900 which will be described with reference to FIG. 9. The receiving device 900 which will be described with reference to FIG. 9, estimates a channel state, searches for a precoding matrix appropriate for the estimated channel state with reference to a codebook for an n*n MIMO identical to the codebook 230 for an n*n MIMO used by the transmission device 200, and transmits a precoding matrix indicator matched with the found precoding matrix to the transmission device 200.

The above codebook for the 4*4 MIMO corresponding to a codebook for a 4*4 MIMO which is defined in LTE (Long Term Evolution) standards, includes a rank 4 codebook including 4*4 precoding matrixes, a rank 3 codebook including 4*3 precoding matrixes, a rank 2 codebook including 4*2 precoding matrixes, a rank 1 codebook including 4*1 precoding matrixes, and the like. The rank 3 codebook, the rank 2 codebook and the rank 1 codebook include a 4*3 precoding matrix, a 4*2 precoding matrix and a 4*1 precoding matrix, which are obtained by dividing a 4*4 precoding matrix included in the rank 4 codebook, respectively.

In the codebook 230 for an n*n MIMO, "n" may be a multiple of 4, which is equal to or greater than 8. Namely, n is equal to 8, 12, 16, 20, and the like.

Also, the codebook 230 for an n*n MIMO may include n*n precoding matrixes obtained by combining 4*4 precoding matrixes in such a manner as to multiply each of the 4*4 precoding matrixes included in the codebook for the 4*4 MIMO by an $(n/4)^2$ number of constants.

Hereinabove, the transmission device 200 has been described. Hereinafter, the codebook 230 for an n*n MIMO will be described.

FIG. 3 is a view showing an example of the codebook 230 for an n*n MIMO.

Referring to FIG. 3, the codebook for the 4*4 MIMO may include a 4*4 precoding matrix 310 such as A, B, C, D, E, F, G, H, I, J, K, L, M, N, O, or P. By combining these 4*4 precoding matrixes 310 together, the codebook 230 for an 8*8 MIMO including an 8*8 precoding matrix 320 when n=8 may be generated, the codebook 230 for a 12*12 MIMO including a 12*12 precoding matrix 330 when n=12 may be generated, and the codebook 230 for a 16*16 MIMO including a 16*16 precoding matrix 340 when n=16 may be generated. As shown FIG. 3, for convenience of description, constants by which each of 4*4 precoding matrixes included in the precoding matrix 320 for n=8, the precoding matrix 330 for n=12 and the precoding matrix 340 for n=16 is multiplied before each of the 4*4 precoding matrixes, are omitted.

The codebook 230 for an n*n MIMO which is described as an exemplary embodiment in this specification, includes precoding matrixes (namely, 8*8, 12*12, 16*16, etc.) each having the form of a square matrix, which are obtained by combining 4*4 precoding matrixes.

However, according to a scheme for combining 4*4 precoding matrixes, the combination of 4*4 precoding matrixes enables the generation of precoding matrixes which are not square matrixes, such as an 8*4 precoding matrix, a 12*4 precoding matrix, a 16*4 precoding matrix, a 12*8 precoding matrix, a 16*12 precoding matrix, and a 16*14 precoding matrix. Then, it is possible to generate a codebook for a more generalized m*n MIMO, which includes the generated precoding matrixes.

Hereinafter, on the assumption that n=8, the codebook 230 for an n*n MIMO will be described in detail. Namely, the codebook 230 for an n*n MIMO in the case where n=8, to includes precoding matrixes, each having the form as denoted by reference numeral 320 in FIG. 3.

When n is equal to 8, each of precoding matrixes included in the codebook 230 for an n*n MIMO has a form shown in formula (1) below, by multiplying four 4*4 precoding matrixes including $R_1$, $R_2$, $R_3$ and $R_4$ by four constants including $\alpha_1$, $\alpha_2$, $\alpha_3$ and $\alpha_4$, respectively.

$$\begin{bmatrix} \alpha_1 R_1 & \alpha_3 R_3 \\ \alpha_2 R_2 & \alpha_4 R_4 \end{bmatrix} \quad (1)$$

The precoding matrix having the form as shown in formula (1) must meet a condition defined by formula (2) below with respect to $\alpha_1$, $\alpha_2$, $\alpha_3$ and $\alpha_4$ corresponding to four constants.

$$\frac{\alpha_3^* \alpha_4}{\alpha_1 \alpha_2} = \pm 1 \text{ where } \alpha_3^* \text{ is a conjugate of } \alpha_3 \quad (2)$$

In formula (2), when $(\alpha_3^* \alpha_4)/(\alpha_1^* \alpha_2)$ is set as c, c has a value of 1 or −1.

In order to generate precoding matrixes included in the codebook 230 for an n*n MIMO, combined 4*4 precoding matrixes included in a codebook for a 4*4 MIMO may be unitary matrixes. Precoding matrixes included in the codebook 230 for an n*n MIMO which have been generated by combining these 4*4 precoding matrixes included in the codebook for the 4*4 MIMO may also be unitary matrixes, in order to have the same characteristics as the codebook for the 4*4 MIMO.

As described above, in order to meet a condition such that the precoding matrixes included in the codebook 230 for an n*n MIMO are unitary matrixes, each of the precoding matrixes included in the codebook 230 for an n*n MIMO must meet both a condition 1 such that the matrix multiplication of each of the precoding matrixes by a Hermitian matrix of each of the precoding matrixes becomes a unit matrix, and a condition 2 such that an inverse matrix of each of the precoding matrixes must exist. Both the condition 1 and the condition 2 may be expressed by formula (3) below.

$$\text{condition 1: } \begin{bmatrix} \alpha_1 R_1 & \alpha_3 R_3 \\ \alpha_2 R_2 & \alpha_4 R_4 \end{bmatrix} \begin{bmatrix} \alpha_1 R_1 & \alpha_3 R_3 \\ \alpha_2 R_2 & \alpha_4 R_4 \end{bmatrix}^H = 1 \quad (3)$$

$$\text{condition 2: } \begin{bmatrix} \alpha_1 R_1 & \alpha_3 R_3 \\ \alpha_2 R_2 & \alpha_4 R_4 \end{bmatrix}^{-1} : \text{exists}$$

In formula (3), in order to meet the condition 1, an equation below must be satisfied (herein, it is assumed that $\alpha_1$ is equal to 1).

$$\begin{bmatrix} R_1 R_1^H + u_3 u_3^* R_3 R_3^H & \alpha_2^* R_1 R_2^H + \alpha_3 u_4^* R_3 R_4^H \\ \alpha_2 R_2 R_1^H + \alpha_3^* \alpha_4 R_4 R_3^H & \alpha_2^* \alpha_2 R_2 R_2^H + \alpha_4^* \alpha_4 R_4 R_4^H \end{bmatrix} = 1$$

Because $R_n R_n^H = I$ for every n, $\alpha_2^* R_1 R_2^H + \alpha_3 \alpha_4^* R_3 R_4^H = 0$ or $\alpha_2 R_2 R_1^H + \alpha_3^* \alpha_4 R_4 R_3^H = 0$.

Also, in order to meet the condition 2, a determinant of a relevant precoding matrix is not zero as defined by a formula below.

$$\begin{bmatrix} \alpha_1 R_1 & \alpha_3 R_3 \\ \alpha_2 R_2 & \alpha_4 R_4 \end{bmatrix} \neq 0$$

As described above, when n=8, 8*8 precoding matrixes are generated by combining 4*4 precoding matrixes, and 8*8 precoding matrixes which meet the condition 1 and the condition 2 are selected from among the generated 8*8 precoding matrixes and then arranged. Next, a discrimination is made between a case where $c=(\alpha_3^* \alpha_4)/(\alpha_1^* \alpha_2)$ is equal to 1 and a case where $c=(\alpha_3^* \alpha_4)/(\alpha_1^* \alpha_2)$ is equal to −1, and then the codebook 230 for an n*n MIMO is represented in each case as shown in FIG. 4. In FIG. 4 to FIG. 6, $R_V$ signifies a matrix matched with a rank-4 codeword matched with (n−1) which is a Precoding Matrix Indicator (PMI) in the codebook for the 4*4 MIMO. According to the notation used in standards, $R_V$ denoted in FIG. 4 to FIG. 6 is identical to $R_V = W_{V-1}^{(4)}$.

In relation to the representation of $R_V = W_{V-1}^{(4)}$, a 4*4 precoding matrix W is selected from FIG. 10 illustrating a codebook for a 4*4 MIMO, with respect to 4 antenna ports ($p \in \{0, 1, 2, 3\}$). Herein, $W_V^{\{s\}}$ is a matrix defined in a column given by a set $\{s\}$, from the representation of $$W_V = 1 - 2 u_V u_V^H / u_V^H u_V.$$

Herein, I represents a 4*4 identity matrix, and a $u_V$ vector is given in FIG. 10.

Meanwhile, in precoding matrixes generated by combining the 4*4 precoding matrixes included in the codebook for the 4*4 MIMO, a repeated combination may be included, and a combination related to antenna mapping may exist.

Accordingly, each of the precoding matrixes included in the codebook 230 for an n*n MIMO may include precoding matrixes obtained by removing a repeated combination among precoding matrixes which may be generated by combining the 4*4 precoding matrixes included in the codebook for the 4*4 MIMO. FIG. 5 illustrates the codebook 230 for an n*n MIMO, which includes precoding matrixes obtained by removing a repeated combination from the codebook 230 for an n*n MIMO as shown in FIG. 4 as described above.

Also, the codebook 230 for an n*n MIMO may include precoding matrixes obtained by removing a repeated combination and a combination related to antenna mapping among the precoding matrixes which may be generated by combining the 4*4 precoding matrixes included in the codebook for the 4*4 MIMO. FIG. 6 illustrates the codebook 230 for an n*n MIMO, which includes the precoding matrixes obtained by removing a repeated combination and a combination related to antenna mapping as described above.

In the case of two precoding matrixes below included in the codebook 230 for an n*n MIMO as shown in FIG. 4

$$\begin{bmatrix} R_1 & R_3 \\ R_2 & R_4 \end{bmatrix} \text{ and } \begin{bmatrix} R_3 & R_1 \\ R_4 & R_2 \end{bmatrix},$$

to the two precoding matrixes are used for an identical precoder which performs precoding by using in some layers and performs precoding by using $[R_3 R_4]^T$ in other layers. FIG. 5 illustrates the codebook 230 for an n*n MIMO, which includes precoding matrixes obtained by removing a repeated combination among precoding matrixes included in the codebook 230 for an n*n MIMO as shown in FIG. 4 as described above.

Also, in the case of two precoding matrixes below included in the codebook 230 for an n*n MIMO as shown in FIG. 4 or FIG. 5

$$\begin{bmatrix} R_1 & R_3 \\ R_2 & R_4 \end{bmatrix} \text{ and } \begin{bmatrix} R_2 & R_4 \\ R_1 & R_3 \end{bmatrix},$$

precoding is performed by using $[R_1R_2]^T$ or $[R_2R_1]^T$ in an identical layer, and precoding is performed by using $[R_3R_4]^T$ or $[R_4R_3]^T$ in other layers. The relation between the two precoding matrixes may be explained as the application of an antenna mapping technique or an antenna selection technique. As described above, when the codebook 230 for an n*n MIMO as shown in FIG. 5 is first obtained by removing a repeated combination from the codebook 230 for an n*n MIMO as shown in FIG. 4 and then a combination related to antenna mapping is further removed from the codebook 230 for an n*n MIMO as shown in FIG. 5, another codebook according to the removal operation may be represented as shown in FIG. 6.

By using some or all of codewords specified in FIG. 4 to FIG. 6, which may be combined, it is possible to generate a precoder codebook having a larger array, for example, a precoder codebook (namely, the codebook 230 for an n*n MIMO in the case where n=8) appropriate for a MIMO system using 8 transmission antennas.

The generation of this precoder codebook (namely, the codebook 230 for an n*n MIMO in the case where n=8) may be implemented by using one codebook and one feedback factor (PMI) as shown in FIG. 7, or may be implemented by using two codebooks and two feedback factors (PMI 1 and PMI 2) as shown in FIG. 8. At this time, the former may need 3 bits, and the latter may need 4 bits. In this regard, constants $\alpha_1$, $\alpha_2$, $\alpha_3$ and $\alpha_4$ which are described in this entire specification, will be represented as $\alpha_0$, $\alpha_1$, $\alpha_2$ and $\alpha_3$ by different subscripts in FIG. 7 and FIG. 8.

According to the above description, an exemplary embodiment of the present invention may provide a method for designing a codebook for an array of a larger size (namely, the codebook 230 for an n*n MIMO) by using a codebook for an array of a small size (namely, the codebook for the 4*4 MIMO) in order to extend the size of a codebook, and to provide a wireless communication system capable of increasing communication capacity through the method.

A method for transmitting information by the transmission device 200 according to an exemplary embodiment as described above will be briefly described below.

A method for transmitting information by the transmission device 200 includes: mapping a codeword to be transmitted to one or more layers; and precoding mapped symbols by using an n*n precoding matrix matched with an input precoding matrix indicator (also referred to as "codebook index"), among n*n precoding matrixes included in a codebook for an n*n MIMO including n*n precoding matrixes obtained by combining 4*4 precoding matrixes included in the codebook 230 for the 4*4 MIMO.

As described above, the transmission device 200 according to an exemplary embodiment of the present invention may include or use a recording medium, in which data of the codebook 230 for an n*n MIMO is recorded, to transmit information. Data of the codebook 230 for an n*n MIMO, which is recorded in the recording medium, may be read by a computer (herein, the computer may be the transmission device 200).

Accordingly, an exemplary embodiment of the present invention provides a computer-readable recording medium which records data of the codebook 230 for an n*n MIMO, which includes precoding matrixes, which are obtained by combining 4*4 precoding matrixes included in the codebook for the 4*4 MIMO, and for which a search is made in response to a precoding matrix indicator.

Hereinabove, the transmission device 200 and the codebook 230 for an n*n MIMO that the transmission device 200 uses, have been described. Hereinafter, a receiving device will be described.

Figure 9:
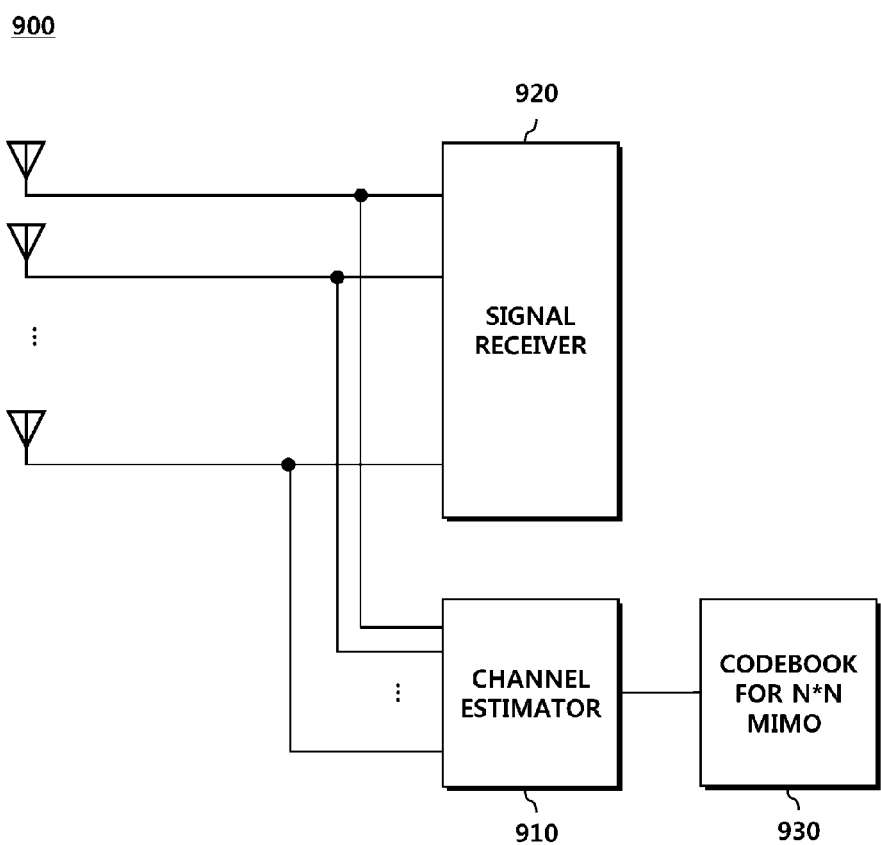
FIG. 9 is a block diagram showing the configuration of a receiving device according to an exemplary embodiment of the present invention.

FIG. 9 is a block diagram showing the configuration of a receiving device 900 according to an exemplary embodiment of the present invention.

Referring to FIG. 9, the receiving device 900 may include a channel estimator 910, a signal receiver 920 and the like, and may include or use a recording medium, in which data of a codebook 930 for an n*n MIMO is recorded. The receiving device 900 may be a communication system or a receiving device of the UE 10 as shown in FIG. 1.

The channel estimator 910 included in the receiving device 900 transmits a precoding matrix indicator selected according to a channel state by using the codebook 930 for an n*n MIMO which includes n*n precoding matrixes obtained by combining 4*4 precoding matrixes included in a codebook for a 4*4 MIMO, to the transmission device 200 as shown in FIG. 2. Also, the signal receiver 920 receives a precoded signal from the transmission device 200, based on the precoding matrix indicator transmitted by the channel estimator 910.

The channel estimator 910 may estimate a channel state, and may obtain a channel matrix appropriate for the estimated channel state. Then, the channel estimator 910 may search for a precoding matrix closest to the channel matrix obtained according to the channel state among precoding matrixes included in the codebook 930 for an n*n MIMO, and may select a precoding matrix indicator matched with the found precoding matrix. At this time, the used codebook 930 for an n*n MIMO is identical to the codebook 230 for an n*n MIMO that the transmission device 200 uses. Accordingly, the codebook 930 for an n*n MIMO that the receiving device 900 uses, has the same characteristics as the codebook 230 for an n*n MIMO that the transmission device 200 uses, which has been described above.

A method for receiving information by the receiving device 900 will be briefly described below. A method for receiving information by the receiving device 900 includes: transmitting a precoding matrix indicator selected based on a channel state information (for example, a channel matrix) by using the codebook 930 for an n*n MIMO which includes the n*n precoding matrixes obtained by combining the 4*4 precoding matrixes included in the codebook for the 4*4 MIMO; and receiving a precoded signal based on the transmitted precoding matrix indicator.

As described above, the receiving device 900 according to an exemplary embodiment of the present invention may include or use the recording medium, in which data of the codebook 930 for an n*n MIMO is recorded, in order to receive information. The data of the codebook 930 for an n*n MIMO, which is recorded in the recording medium, may be read by a computer (herein, the computer may be the receiving device 900).

Accordingly, an exemplary embodiment of the present invention may provide a computer-readable recording medium which records data of the codebook 930 for an n*n MIMO, which includes n*n precoding matrixes, which are obtained by combining 4*4 precoding matrixes included in the codebook for the 4*4 MIMO, and for which a search is made based on channel state information.

Although the above description is only an illustrative description of the technical idea of the present invention, those having ordinary knowledge in the technical field of the present invention will appreciate that various modifications, additions and substitutions are possible, without departing from the scope and spirit of the invention as disclosed in the appended claims. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and all of the technical ideas included within the scope equivalent to the claims should be construed as being included within the right scope of the present invention.

The invention claimed is:

1. A transmission device in a wireless communication system, the transmission device comprising:
    a layer mapper to map a codeword to one or more layers; and
    a precoder to precode symbols mapped by the layer mapper, by using an n*n precoding matrix matched with an input precoding matrix indicator among n*n precoding matrixes included in a codebook for an n*n Multi Input Multi Output (MIMO), which includes the n*n precoding matrixes obtained by combining 4*4 precoding matrixes included in a codebook for a 4*4 MIMO,
    wherein the codebook for the n*n MIMO includes precoding matrixes obtained by combining the 4*4 precoding matrixes in such a manner as to multiply each of the 4*4 precoding matrixes included in the codebook for the 4*4 MIMO by an $(n/4)^2$ number of constants.

2. The transmission device as claimed in claim 1, wherein the codebook for a 4*4 MIMO is a codebook for a 4*4 MIMO which is defined in LTE (Long Term Evolution) standards, and comprises a rank 4 codebook including 4*4 precoding matrixes, a rank 3 codebook including 4*3 precoding matrixes, a rank 2 codebook including 4*2 precoding matrixes, and a rank 1 codebook including 4*1 precoding matrixes.

3. The transmission device as claimed in claim 1, wherein the 4*4 precoding matrixes included in the codebook for the 4*4 MIMO correspond to unitary matrixes.

4. The transmission device as claimed in claim 1, wherein the n*n precoding matrixes included in the codebook for the n*n MIMO correspond to unitary matrixes.

5. The transmission device as claimed in claim 1, wherein n corresponds to a multiple of 4, which is equal to or greater than 8.

6. The transmission device as claimed in claim 1, wherein, when n is equal to 8, each of the precoding matrixes included in the codebook for the n*n MIMO has a form of $$\begin{bmatrix} \alpha_1 R_1 & \alpha_3 R_3 \\ \alpha_2 R_2 & \alpha_4 R_4 \end{bmatrix}$$

by multiplying four 4*4 precoding matrixes including $R_1, R_2, R_3$ and $R_4$ by four constants including $\alpha_1, \alpha_2, \alpha_3$ and $\alpha_4$, respectively, and the four constants meet a condition defined by $$\frac{\alpha_3^* \alpha_4}{\alpha_1 \alpha_2} = \pm 1$$

where $\alpha_3^*$ is a conjugate of $\alpha_3$.

7. The transmission device as claimed in claim 1, wherein, with respect to each of the n*n precoding matrixes included in the codebook for the n*n MIMO, matrix multiplication of each of the n*n precoding matrixes by a Hermitian matrix of each of the n*n precoding matrixes becomes a unit matrix, and an inverse matrix of each of the n*n precoding matrixes exists.

8. The transmission device as claimed in claim 1, wherein the codebook for the n*n MIMO includes precoding matrixes obtained by removing a repeated combination among the n*n precoding matrixes capable of being generated by combining the 4*4 precoding matrixes included in the codebook for the 4*4 MIMO.

9. The transmission device as claimed in claim 8, wherein the codebook for the n*n MIMO includes precoding matrixes obtained by removing a combination related to antenna mapping among n*n precoding matrixes, which are capable of being generated by combining the 4*4 precoding matrixes included in the codebook for the 4*4 MIMO, and which are obtained by removing a repeated combination among the generated n*n precoding matrixes.

10. A method of an apparatus including a layer mapper and a precoder for transmitting information in a wireless communication system, the method comprising:
    mapping, by the layer mapper, a codeword to be transmitted to one or more layers; and
    precoding, by the precoder, symbols mapped by a layer mapper, by using an n*n precoding matrix matched with an input precoding matrix indicator among n*n precoding matrixes included in a codebook for an n*n Multi Input Multi Output (MIMO), which includes the n*n precoding matrixes obtained by combining 4*4 precoding matrixes included in a codebook for a 4*4 MIMO,
    wherein the codebook for the n*n MIMO includes precoding matrixes obtained by combining the 4*4 precoding matrixes in such a manner as to multiply each of the 4*4 precoding matrixes included in the codebook for the 4*4 MIMO by an $(n/4)^2$ number of constants.

11. A receiving device in a wireless communication system, the receiving device comprising:
    a channel estimator to transmit a precoding matrix indicator selected according to a channel state by using a codebook for an n*n Multi Input Multi Output (MIMO) which includes n*n precoding matrixes obtained by combining 4*4 precoding matrixes included in a codebook for a 4*4 MIMO; and
    a signal receiver to receive a precoded signal based on the transmitted precoding matrix indicator,
    wherein the codebook for the n*n MIMO includes precoding matrixes obtained by combining the 4*4 precoding matrixes in such a manner as to multiply each of the 4*4 precoding matrixes included in the codebook for the 4*4 MIMO by an $(n/4)^2$ number of constants.

12. A method of an apparatus including a channel estimator and a signal receiver for receiving information in a wireless communication system, the method comprising:
    transmitting, by the channel estimator, a precoding matrix indicator selected based on channel state information by using a codebook for an n*n Multi Input Multi Output (MIMO) which includes n*n precoding matrixes obtained by combining 4*4 precoding matrixes included in a codebook for a 4*4 MIMO; and receiving, by the signal receiver, a precoded signal based on the transmitted precoding matrix indicator, wherein the codebook for the n*n MIMO includes precoding matrixes obtained by combining the 4*4 precoding matrixes in such a manner as to multiply each of the 4*4 precoding matrixes included in the codebook for the 4*4 MIMO by an $(n/4)^2$ number of constants.

13. A transmission device in a wireless communication system, the transmission device comprising:

a layer mapper to map a codeword to one or more layers; and a precoder to precode symbols mapped by the layer mapper, by using an n*n precoding matrix matched with an input precoding matrix indicator among n*n precoding matrixes included in a codebook for an n*n MIMO, which includes the n*n precoding matrixes obtained by combining 4*4 precoding matrixes included in a codebook for a 4*4 MIMO, wherein the codebook for the n*n MIMO includes precoding matrixes obtained by removing a repeated combination among the n*n precoding matrixes capable of being generated by combining the 4*4 precoding matrixes included in the codebook for the 4*4 MIMO.

14. The transmission device as claimed in claim 13, wherein the codebook for the n*n MIMO includes precoding matrixes obtained by removing a combination related to antenna mapping among n*n precoding matrixes, which are capable of being generated by combining the 4*4 precoding matrixes included in the codebook for the 4*4 MIMO, and which are obtained by removing a repeated combination among the generated n*n precoding matrixes.

15. A method of an apparatus including a layer mapper and a precoder for transmitting information in a wireless communication system, the method comprising:

mapping, by the layer mapper, a codeword to be transmitted to one or more layers; and precoding, by the precoder, symbols mapped by a layer mapper, by using an n*n precoding matrix matched with an input precoding matrix indicator among n*n precoding matrixes included in a codebook for an n*n MIMO, which includes the n*n precoding matrixes obtained by combining 4*4 precoding matrixes included in a codebook for a 4*4 MIMO, wherein the codebook for the n*n MIMO includes precoding matrixes obtained by removing a repeated combination among the n*n precoding matrixes capable of being generated by combining the 4*4 precoding matrixes included in the codebook for the 4*4 MIMO.

16. The method as claimed in claim 15, wherein the codebook for the n*n MIMO includes precoding matrixes obtained by removing a combination related to antenna mapping among n*n precoding matrixes, which are capable of being generated by combining the 4*4 precoding matrixes included in the codebook for the 4*4 MIMO, and which are obtained by removing a repeated combination among the generated n*n precoding matrixes.

* * * * *